United States Patent [19]

Laub

[11] 3,959,581

[45] May 25, 1976

[54] SELF-COMPENSATING FOCUS SYSTEM FOR OPTICAL VIDEO PLAYBACK DEVICE

[75] Inventor: Leonard J. Laub, Chicago, Ill.

[73] Assignee: Zenith Radio Corporation, Chicago, Ill.

[22] Filed: Jan. 29, 1975

[21] Appl. No.: 545,245

[52] U.S. Cl. .................. 178/6.6 R; 178/6.6 DD; 178/6.7 A; 179/100.3 V; 250/201
[51] Int. Cl.² ................. H04N 5/76; G11B 7/12
[58] Field of Search ........ 178/6.6 R, 6.6 DD, 6.7 A, 178/DIG. 29, 7.6; 179/100.3 V; 352/22, 26, 103; 250/201, 202, 203 R; 340/173 LM; 350/46, 84, 255

[56] References Cited
UNITED STATES PATENTS

| 2,972,660 | 2/1961 | Toulon | 178/6.7 A |
|---|---|---|---|
| 3,588,218 | 1/1971 | Hunt et al. | 178/DIG. 29 |
| 3,673,412 | 6/1972 | Olson | 250/201 |
| 3,743,395 | 7/1973 | Preuss | 352/22 |
| 3,833,769 | 9/1974 | Compaan et al. | 178/6.7 A |
| 3,848,095 | 11/1974 | Wohlmut et al. | 179/100.3 V |
| 3,873,763 | 3/1975 | Janssen | 178/6.6 R |
| 3,876,841 | 4/1975 | Kramer et al. | 179/100.3 V |
| 3,876,842 | 4/1975 | Bouwhuis | 178/6.7 A |

OTHER PUBLICATIONS

Rice et al., An Experimental Television Recording and Playback System using photographic Discs, Jour of the SMPTE, Vol. 79, No. 11, pp. 997–1002, 11/70.

Primary Examiner—Raymond F. Cardillo, Jr.
Attorney, Agent, or Firm—Cornelius J. O'Connor

[57] ABSTRACT

An optical video playback device having a self-compensating focus system Photographic one or more afocal relays for increasing the operating range of such a system.

6 Claims, 5 Drawing Figures

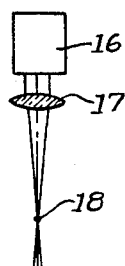
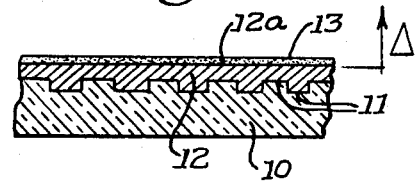
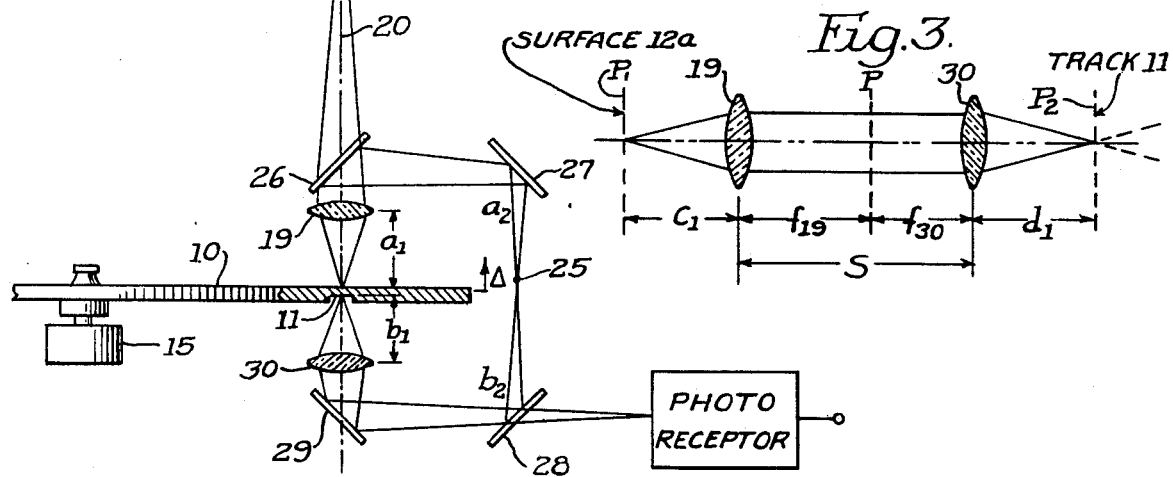
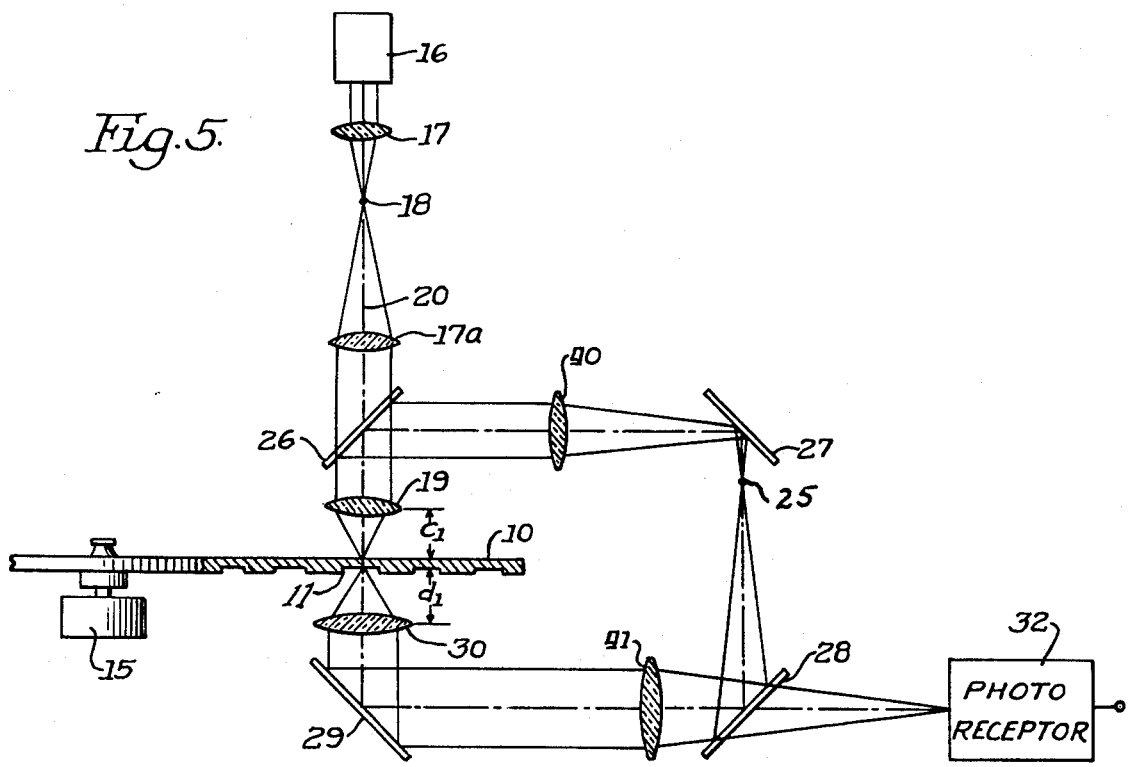
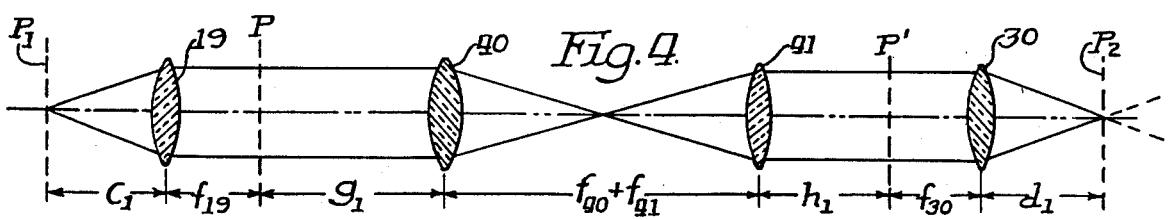

3,959,581

SELF-COMPENSATING FOCUS SYSTEM FOR OPTICAL VIDEO PLAYBACK DEVICE

RELATED APPLICATION

The present invention is related to and is a further development of the self-compensating focus system described and claimed in a copending application, Ser. No. 545,072, filed concurrently herewith, in the name of Robert Adler and assigned to the assignee of the subject invention.

BACKGROUND OF THE INVENTION

As explained in the Adler application, an optical video playback device has many attractive attributes but it is subject to the practical limitation of maintaining proper conditions of focus which, of course, is necessary for optimum playback of video discs. The prior practices for achieving focus control, i.e., focus servo systems, aerodynamic stabilization of the disc, etc., are improved upon with the self-compensating focus system described in Adler's application. Adler's approach is attractive both because of the simplification it represents in comparison with prior techniques and because it lends itself more readily to production. The present invention constitutes an improvement in Adler's solution to the difficult problem of focus control in that it increases the useful operating range of a self-compensating system and further because it facilitates the implementation of self-compensating focus in practical forms for video playback devices.

OBJECTS OF THE INVENTION

Accordingly, it is a principal object of the invention to provide an improved self-compensating focus system for an optical video playback device.

It is another and particular object of the invention to provide a self-compensating focus system characterized by an improved operating range.

SUMMARY OF THE INVENTION

The invention is addressed to a self-compensating focus system for an optical video playback device in which a beam of energy is employed for reading a record having information stored in a track thereon. The record has one surface that is a reflector and an oppositely disposed surface through which the read beam may gain access to the track. An improvement in such a system comprises means, including a plurality of mirrors, at least one of which is a semi-transparent mirror, for establishing an optical path between the reflector surface and the oppositely disposed track bearing surface for directing energy reflected from those surfaces. A first lens, included in the optical path, has a predetermined focal length for focusing the reading beam on the reflector surface of the record. A second lens, also included in the optical path and having a predetermined focal length, focuses the beam energy reflected from the reflector surface onto the track. The aforesaid first and second lenses are spaced apart a distance equal to the sum of their individual focal lengths so as to form an afocal optical relay for focusing beam energy reflected from the reflector surface onto the track. The ratio of the numerical aperture of the second lens to the numerical aperture of the first lens is substantially equal to $\sqrt{2}$. Finally, a photoreceptor, disposed adjacent the semi-transparent mirror, responds to beam energy reflected from the track to derive an output signal representative of the information stored in the track.

BRIEF DESCRIPTION OF THE DRAWINGS

The features of the invention which are believed to be novel are set forth with particularity in the appended claims. The invention, together with further objects and advantages thereof, may best be understood by reference to the following description taken in connection with the accompanying drawings in which:

FIGS. 1 and 2 are the correspondingly numbered figures of the Adler application which is incorporated herein by reference;

FIG. 3 represents a modification of the focus system of FIG. 2 incorporating the subject invention;

FIG. 4 represents another and preferred embodiment of the invention; and

FIG. 5 shows a video playback device having a self-compensating focus system of the type disclosed in FIG. 4.

DESCRIPTION OF THE PREFERRED EMBODIMENT

Before considering the details of the focus system proposed herein and its improvement over prior systems, it is appropriate to review the make up and operation of an optical video playback device featuring a self-compensating focus system. Accordingly, FIG. 1 shows a segment of a reflective video disc and FIG. 2 represents an optical playback device suitable for reading such a disc. As indicated above, both of these figures are shown and described in the aforementioned Adler application.

An optical type of playback device to which the invention has application reads information from a reflective, as distinguished from a transmissive, video record which can take the form of a flexible disc. The disc is constructed of a material, such as polyvinyl chloride, which has the capability of storing information to be derived, or read out by scanning the disc with a laser beam. It is most convenient, especially when the stored information is a continuous program, that the storage track be a multiturn spiral having elemental segments along the track which collectively constitute a spatial representation of a program-modulated carrier signal.

While the specifics of the storage track are subject to choice, a popular form features cavities or pits which alternate with lands to define the stored information. In preparing the master from which such a disc is processed, it is common practice to take a disc of glass, coated with a photosensitive material, such as positive-working photoresist, and scan it with a laser beam which is controlled by a carrier signal frequency modulated with program information. Scanning with the laser causes the spiral track to have alternating segments of exposed and unexposed resist which, after development by treating the disc with a developer for the resist, produces the aforesaid succession of pits alternating with lands disposed in a spiral track and collectively constituting a spatial representation of the frequency modulated carrier signal employed in controlling the recording laser beam. Stampers prepared from such a master are used in replicating discs for distribution.

FIG. 1 shows a segment of a disc 10 which, preferably, is formed of polyvinyl chloride, a substance transmissive to a laser reading beam. Actually, the disc section depicted in FIG. 1 is taken tangential to a track 11 constituting part of a multiturn spiral-shaped storage track formed on one surface of the disc. As shown in that drawing, track 11 comprises a train of pits interspersed with lands. The pitted surface of the disc is overlaid with a layer 12 of aluminum of sufficient thickness, in the order of one to two microns, to fill the pits of the record track and thereby provide a flat reflecting surface 12a atop track 11. This surface, in turn, may be covered with a coating 13 of lacquer. It will be appreciated that the record track 11, now covered by layer 12 and coating 13, is protected against dust, surface irregularities and the like. In reading such a disc, the reading beam must approach through the transparent substrate 10 and be focused on the track being read.

The program information recorded on the disc is of no consequence, insofar as the invention is concerned. It is customary, however, that it be a recording which corresponds to the NTSC format or to one sufficiently related to that format that transcoding from one form to the other is easily accomplished. For example, in that instance, reading of the disc may develop an output signal which is frequency modulated with the program information stored in the disc. It may be used directly or after transcoding, if necessary, to control a television receiver for image reproduction in either monochrome or color depending upon the information content of the stored program. Of course, the signal coding and transcoding, mastering and replication are well known in the art and, of themselves, constitute no part of the subject invention.

The present invention is most particularly concerned with playback devices that employ flexible discs rotated at a high speed, of the order of 1,800 rpm, in what is referred to as a flying technique. As shown in FIG. 2, a flexible disc 10 threads over a spindle and motor drive 15 with appropriate means (not shown) for removably securing the disc to the spindle to the end that the motor driven spindle rotates the disc at a predetermined speed.

Scanning or reading of the disc is accomplished by a laser beam supplied from a source 16 which is usually of the helium neon variety. Assuming for the moment a static situation, an initial lens 17 establishes a primary focus 18 of the beam. The optical system includes means for focusing this reading beam of energy onto one surface, specifically flat reflecting surface 12a, of the record. This focusing means comprises a first objective lens 19 disposed across a first optical path extending from laser source 16 to record 10 and having an axis 20.

The optical system has further means for directing the beam reflected from surface 12a, and returned through lens 19, along a second optical path which extends to an intermediate focus 25, and thence to the opposite or under surface of record 10. More particularly, this directing means includes a plurality of at least partially reflecting, as well as fully reflecting, surfaces which, for the embodiment of FIG. 2, comprises a first semi-transparent mirror 26, a solid reflecting mirror 27, another semi-transparent mirror 28, and a second solid reflecting mirror 29. The optical path that they collectively define causes reflected energy of the reading beam to be ultimately directed to track 11 essentially along the axis 20, but approaching disc 10 from the underside. In order to read out the information from the disc this second optical path includes means for imaging the intermediate focus or spot 25 onto the under surface of the record track. This means is a second objective or reading lens 30 disposed across the above-described second optical path.

In operation, assuming disc 10 to be properly positioned and rotating in a desired reference plane, light from laser 16 travels along the first optical path and is focused by lens 19 on the upper reflective surface 12a of the disc. Upon reflection, it is returned through lens 19 to mirror 26 where a portion is directed along the second optical path and comes to an intermediate focus 25. The beam is then focused by reading lens 30 upon track 11 of the disc. Ideally, the point of focus established by lens 30 is intermediate the two planar surfaces of disc 10, in fact, the focal point occurs at the storage track 11. After further reflection due to aluminum layer 12, the beam energy, now modulated by the diffractive effect of the pits, is redirected along the second optical path by way of lens 30 and mirrors 29 and 28, in that order, to a light responsive means in the form of a photoreceptor 32 which, in known manner, develops an electrical output signal representative of the information stored in the record.

As noted above, the reading beam is focused upon the reflectively backed storage track 11 by lens 30. This, of course, is an optimum condition of focus which cannot be expected to be maintained when the disc is being flown. In practice, then, the disc will be displaced from its reference plane and the track will depart from the focal plane of lens 30. As a result, the spacing between the top reflective surface 12a of the disc and lens 19 varies with time. When that occurs, the location of the intermediate focus 25 likewise changes and, unless some compensating change is effected in the optical path between lens 30 and the track, intermediate spot 25 will no longer be imaged on track 11 by lens 30 and the focus conditions necessary for optimum reading of the disc will no longer prevail.

The manner in which Adler's focus system effects a self-compensation of this defocusing will now be explained. First, the symbols employed in FIG. 2 are defined as follows:

$a_1$ represents the effective spacing between lens 19 and reflective surface 12a $a_2$ represents the effective spacing between lens 19 and intermediate focus 25

$b_1$ represents the effective spacing between lens 30 and track 11

$b_2$ represents the effective spacing between lens 30 and intermediate focus 25

$m_{19}=a_2/a_1=$ magnification of lens 19

$m_{30}=b_2/b_1=$ magnification of lens 30

$\Delta$ represents a displacement of reflective surface 12a from a reference position.

Assume now that surface 12a of the disc moves upwards from the reference plane (toward lens 19) by an incremental distance $\Delta$, the focus of the beam established by lens 19 is then displaced from its original location by twice that incremental distance, or by $2\Delta$. Consequently, the distance $a_2$ from lens 19 to the intermediate focal point 25 increases, moving the intermediate spot vertically downward, as viewed in FIG. 2, by $2\Delta(m_{19})^2$. As a result, the distance $b_2$ decreases by the same amount while the distance $b_1$ increases by an amount $2\Delta(m_{19})^2/(m_{30})^2$. This increase tends to compensate for the out-of-focus condition occasioned by disc displacement.

Out-of-focus conditions may be avoided and a self-compensating property imparted to the optical system by appropriately relating the magnification factors of lenses 19 and 30. In particular, if the ratio of the magnification factor $m_{30}$ of reading lens 30 to the magnification factor $m_{19}$ of lens 19 is substantially equal to $\sqrt{2}$, compensation is achieved. Where the magnification factors of the lenses are thus related, any change in distance $a_1$ caused by displacement $\Delta$ of disc 10 produces a compensating change Δ in distance $b_1$ and maintains the beam properly focused on the storage track of the disc. This compensation of focus, however, is realized only for a limited range of displacements of the disc from its nominal or reference position. For large displacements of the disc, the nonlinearity of the relationship between the changes in distances $a_1$ and $b_1$ becomes important and the focus of reading lens 30 no longer follows and compensates for displacement of the disc. A useful range of displacements (perhaps ± 100μm) is, nevertheless, accommodated. Further improvement in the range of linearity is the subject of the present invention.

A distinct improvement in the range of disc displacements that may be compensated for in a video disc optical system is realizable with the arrangement of FIG. 3, which replaces the "second optical path" of the Adler system. For convenience of illustration only, this figure shows a linear optical path extending from planar reflective surface $12_a$ of disc 10 (represented by broken-construction line $P_1$) to storage track 11 of the disc (represented by broken-construction line $P_2$). Selective dimensioning of this portion of the optical system causes the lenses 19 and 30 to constitute an afocal optical relay. More particularly, the focal length of lens 19 is shown by dimension line $f_{19}$ while the focal length of lens 30 is shown by dimension line $f_{30}$. In this arrangement, the separation S of these lenses is made equal to the sum of their individual focal lengths. The focused reading beam located at plane $P_1$ is focused, via lenses 19 and 30, onto plane $P_2$. In other words, the beam reflected from planar reflective surface $12a$ is imaged on storage track 11.

Now, and as will be shown, so long as the focal lengths of lenses 19 and 30 are related by $f_{19}/f_{30} = \sqrt{2}$, the range over which the focus system is self-compensating will be substantially increased. The arrangement of FIG. 3 is functionally the same as that of FIG. 2 but since the focus system of FIG. 3 has been dimensioned to constitute an afocal optical relay, it exhibits constant longitudinal magnification. In other words, a change in object distance (i.e., a change in dimension $C_1$ due, for example, to an unwanted displacement of disc 10 relative to lens 19), is translated into a related and compensating change in image distance (a change in dimension $d_1$), causing the reading spot to follow the displacement of the disc and preserving its focus on storage track 11, regardless of the initial value of the object distance. The relation of these changes to one another is, of course, subject to control by choice of focal length for lens 19 and lens 30. For example, where they have the same focal length, the longitudinal magnification factor is unity and the displacement of the object occasions an equal displacement of the image in same direction. Of course, unity magnification is inappropriate for the case under consideration for which a longitudinal magnification factor of ½ is required for self-compensation in the focus system.

While a focus system of the type shown in FIG. 3 is indeed operable and, by virtue of its constant longitudinal magnification factor not only distinguishes from the Adler embodiment of FIG. 2 but provides a greater useful range than attainable with the FIG. 2 system, it too may be further improved upon in the manner of FIG. 4. This embodiment has the distinct advantage of presenting a physical path length of a predetermined large value, necessary to, in effect, wrap around disc 10, a requirement evident from FIG. 2. At the same time, this embodiment permits use of practical lenses with short focal lengths and high numerical apertures needed to provide a fine enough reading spot for good resolution. To attain this result, the embodiment of FIG. 4 includes another pair of lenses 40, 41 arranged to constitute a second afocal optical relay. More particularly, this relay is positioned between lenses 19 and 30 of the first afocal relay.

The basic system of FIG. 3 may be broken at the plane P (the mutual interior focal plane of lenses 19 and 30) and a second afocal relay composed of lenses 40 and 41, inserted. As seen in FIG. 4, this relay serves to image plane P onto plane P' so as to keep these planes in optical coincidence while separating them physically, increasing the overall length of the system by the sum of the distances $g_1, f_{40}, f_{41}$ and $h_1$. The distances $g_1$ and $h_1$ are interdependent but freely variable so that the total extension may be adjusted about a nominal value of $2f_{40}+2f_{41}$.

In this situation:

$$g_1 = f_{40}\left(\frac{f_{40}}{f_{41}}+1\right) - h_1\left(\frac{f_{40}}{f_{41}}\right)^2.$$

In the case of $f_{40}=f_{41}$ (unity magnification by the second relay):

$g_1 = 2f_{40} - h_1$, or $g_1 + h_1 = 2f_{40} + f_{41}$.

In the case of $$\frac{f_{40}}{f_{41}} = \frac{1}{\sqrt{2}},$$

which allows $f_{19}=f_{30}$, $$g_1 = f_{40}\left(\frac{1+\sqrt{2}}{\sqrt{2}}\right) - \frac{h_1}{2}.$$

The second relay performs no focusing function; it simply increases the physical path length and the other relay of lens 19 and 30 focuses the reading spot on the storage track (plane $P_2$) just as in the case of the FIG. 3 arrangement. Indeed, the second relay is optically passive if it is dimensioned to have unity longitudinal magnification but that is not a limitation on the system. The magnification factors of both relays must be properly related to give an overall longitudinal magnification of ½ whether either relay has unity magnification or not. The system is flexible and the magnification factors may be chosen to suit the optical and physical requirements of the installation.

FIG. 5 shows the application of the self-compensating focus system of FIG. 4 to an optical video disc playback device of the type shown in, and previously described in connection with, FIG. 2. It will be noted that a second lens 17a has been introduced into the optical system to form in conjunction with lens 17 a beam expanding telescope which feeds the optical system beyond lens 17a with a collimated beam. A practical embodiment of this system has the following specifications:

$f_{19} = f_{30} = 7$mm
$f_{41} = \sqrt{2} \cdot f_{40}$
$c_1 = f_{19}$
$d_1 = f_{30}$
$g_1$ (see FIG. 4) $= f_{40} = 130$mm $h_1$ (see FIG. 4) $= f_{41} = 184$mm With an optical system of this specification, the beam focused onto the disc by lens 30 has a larger cone angle (a greater numerical aperture — NA) than that focused on the obverse side of the disc by lens 19. The ratio of the numerical apertures is the reciprocal of the overall (transverse) magnification and accordingly:

$$\frac{NA_{30}}{NA_{19}} = \sqrt{2}$$

While there has been described particular embodiments of the present invention, it is apparent that changes and modifications may be made therein without departing from the invention in the broader aspects. The aim of the appended claims, therefore, is to cover all such changes and modifications as fall within the true spirit and scope of the invention.

What is claimed is:

1. In a self-compensating focus system for an optical video playback device which includes a source of beam energy for reading a record having information stored in a track disposed thereon, said record having one surface that is a reflector and an oppositely disposed surface through which said reading beam may gain access to said track, the improvement which comprises:

means, including a plurality of mirrors, at least one of which is a semi-transparent mirror, for establishing an optical path between said reflector surface and said opposite surface for directing energy reflected from said surfaces;

means, included in said optical path, comprising a first lens having a predetermined focal length for focusing said reading beam of energy on said reflector surface of said record;

a second lens having a predetermined focal length, also included in said optical path, for focusing beam energy reflected from said reflector surface onto said track, said first and second lenses being spaced apart a distance equal to the sum of their individual focal lengths to form an afocal optical relay for focusing said beam energy reflected from said reflector surface onto said track, the ratio of the numerical aperture of said second lens to the numerical aperture of said first lens being substantially equal to $\sqrt{2}$, and photoreceptor means disposed adjacent said semi-transparent mirror and responsive to beam energy reflected from said track for deriving an output signal representative of the information stored in said track.

2. The improvement in accordance with claim 1 in which the ratio of the focal length of said first lens to the focal length of said second lens is substantially equal to $\sqrt{2}$.

3. The improvement set forth in claim 1 in which an additional pair of lenses is included in said optical path between said first and second lenses and spaced apart to form a second afocal optical relay.

4. The improvement in accordance with claim 3 in which the focal lengths of said first and second lenses are equal and in which the ratio of the focal lengths of said additional pair of lenses is substantially equal to $\sqrt{2}$.

5. The improvement in accordance with claim 3 in which the magnification factor of at least one of said afocal relays is unity.

6. The improvement in accordance with claim 3 in which the ratio of the focal length of said first lens to the focal length of said second lens is substantially equal to $\sqrt{2}$ and in which said second afocal relay has unity magnification.

* * * * *